(12) United States Patent
Ashton et al.

(10) Patent No.: US 8,411,828 B2
(45) Date of Patent: Apr. 2, 2013

(54) INTUITIVE VOICE NAVIGATION

(75) Inventors: Jason A. Ashton, Santa Cruz, CA (US); Caroline G. Henton, Santa Cruz, CA (US); Tarik J. Ghbeish, Boulder Creek, CA (US); John P. Hopprich, Scotts Valley, CA (US)

(73) Assignee: CommonWealth Intellectual Property Holdings, Inc., Scotts Valley, CA (US)

( * ) Notice: Subject to any disclaimer, the term of this patent is extended or adjusted under 35 U.S.C. 154(b) by 359 days.

(21) Appl. No.: 12/580,436

(22) Filed: Oct. 16, 2009

(65) Prior Publication Data

US 2010/0098225 A1    Apr. 22, 2010

Related U.S. Application Data

(60) Provisional application No. 61/106,428, filed on Oct. 17, 2008.

(51) Int. Cl.
*H04M 11/00* (2006.01)
*H04M 1/64* (2006.01)

(52) U.S. Cl. ............... 379/88.18; 379/88.01; 379/88.08

(58) Field of Classification Search .... 379/88.01–88.23; 455/563; 704/246
See application file for complete search history.

(56) References Cited

U.S. PATENT DOCUMENTS

| | | | | |
|---|---|---|---|---|
| 7,027,571 | B1* | 4/2006 | Cook | 379/88.17 |
| 7,515,695 | B1* | 4/2009 | Chan et al. | 379/88.18 |
| 7,619,584 | B2* | 11/2009 | Wolf | 345/1.2 |
| 8,054,952 | B1* | 11/2011 | Or-Bach et al. | 379/88.18 |
| 2002/0080927 | A1* | 6/2002 | Uppaluru | 379/88.01 |
| 2003/0108184 | A1 | 6/2003 | Brown et al. | |
| 2003/0115333 | A1* | 6/2003 | Cohen et al. | 709/227 |
| 2004/0122941 | A1* | 6/2004 | Creamer et al. | 709/224 |
| 2004/0225499 | A1* | 11/2004 | Wang et al. | 704/257 |
| 2005/0036593 | A1 | 2/2005 | Zimgibl et al. | |
| 2005/0119896 | A1 | 6/2005 | Bennett et al. | |
| 2007/0133759 | A1* | 6/2007 | Malik et al. | 379/80 |
| 2008/0062133 | A1* | 3/2008 | Wolf | 345/168 |
| 2009/0024453 | A1* | 1/2009 | Fraser | 705/10 |
| 2010/0272246 | A1* | 10/2010 | Malik et al. | 379/88.18 |

* cited by examiner

*Primary Examiner* — Mohammad Islam

(57) ABSTRACT

Call flow information can build 'intent' into call flows having a series of intended steps and one or more alternative steps for selected intended steps. Users can advance in the call flow based on any response other than one or more alternative valid responses for the one intended step that lead in the call flow to one or more alternative steps to the one intended step because every action in the call flow motivates the user to follow the predetermined ordering. A user can proceed from a first intended step in the series of intended steps to a second intended step in the series of intended steps based on a user's response or information known or discovered about the user.

29 Claims, 13 Drawing Sheets

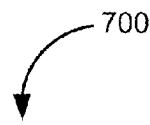

| User Profile | |
|---|---|
| User: | John Smith |
| User's home town: | Palo Alto |
| User's preferred airport: | SFO (or San Francisco International Airport) |
| User's preferred airline: | UAL (or United Airlines) |
| User's preferred type of flight: | Round Trip |
| User's preferred departure time for flights to the East Coast: | Mid-day |
| User's preferred departure time for return flights from the East Coast: | Evening |
| User would always like to check for the lowest fare for air travel: | Yes |
| Trip template1 - label: | New York |
| Trip template1 – departure airport: | SFO |
| Trip template1 – destination airport: | JFK |
| Trip template1 – length of trip in days: | 5 |

FIG. 7

INTUITIVE VOICE NAVIGATION

CROSS-REFERENCES TO RELATED APPLICATIONS

This application claims the benefit of and priority to U.S. Provisional Application No. 61/106,428, filed Oct. 17, 2008 and entitled "Intuitive Voice Navigation," which is incorporated by reference herein for all purposes.

BACKGROUND OF THE INVENTION

The present invention relates to information systems. More specifically, the present invention relates to infrastructure and techniques for improving user experiences while using Interactive Voice Recognition-enabled applications.

In recent years, the combination of interactive voice response (IVR) with speaker-independent automatic speech recognition (ASR) has revolutionized the way people interact with a telephone system. Together, they may be called Interactive Voice Recognition, and it changes the way telephone customers use services such as tele-banking, and make credit card transactions. Interactive voice response can also provide enhanced, more efficient customer support.

Innovative companies, such as SpeakSoft, Inc. of Santa Cruz, Calif., have extended this concept in the United States to 411 telephone directory services. People are able to use systems incorporating these technologies, for example, to book airline tickets, order pizzas, and shop over the phone. Accordingly, speaker-independent voice recognition systems have improved considerably and can be optimized to better handle various (non-native speaker) accents.

One problem though with current telecommunication and information systems is that they are not truly streamlined for natural human interaction. The two most conspicuous and fastest growing information systems in the modern era are the Internet and personal communications devices (primarily mobile devices). Despite the rapid adoption of both of these systems, they are only just beginning to converge. Even with the rapid and pervasive growth of convergence devices, one of the most frequent complaints from users of such systems is their usability. Current devices and systems require humans to learn how to use them instead of offering methods of user interaction that are already natural, social, and culturally normal.

Some problems with these new mobile devices with internet access is they generally tend to have small or feature reduced keypads/keyboards, and diminished screens that limit their usability. Furthermore, as new mobile devices with internet access proliferate, safety concerns increase as users are forced to interact manually with these mobile devices by typing, keying, or scrolling to obtain information while performing activities such as driving, ridding a bike, or event walking.

Accordingly, what is desired is to solve problems relating to user experiences while using Interactive Voice Recognition-enabled applications, some of which may be discussed herein. Additionally, what is desired is to reduce drawbacks related to Interactive Voice Recognition-enabled applications, some of which may be discussed herein.

BRIEF SUMMARY OF THE INVENTION

The present invention relates to information systems. More specifically, the present invention relates to infrastructure and techniques for improving user experiences while using Interactive Voice Recognition-enabled applications.

Against this background of improved accuracy in the core ASR technology, in various embodiments, a streamlined telephone call flow can be provided that builds 'intent' into a call flow or navigation path. In one embodiment, every action in a call flow motivates a caller to follow the path. This, for example, in turn accelerates and enhances the user experience thereby increasing the likelihood of a successful interaction and reducing unnecessary delays, repeated confirmations, and unacceptable lengths of time to complete transactions in IVR enabled systems that could have driven the user away from using such systems.

In further embodiments, one or more techniques provide for more accurate pronunciation in prompts and confirmation messages to guide callers to a more successful (more accurate) recognition through their call flow, such as of their travel itinerary items. In still further embodiments, a combination of speaker-independent ASR is provided with speaker-dependent ASR in the event of a caller's pronunciations falling too far outside the grammar files for an utterance. In some embodiments, an 'opt out' feature is provided for a call flow where other 411 models have an 'opt in' default. In various embodiments, 'dead' telephone numbers for businesses that have ceased operation, or have moved location within the same area code, may be repurposed.

In various embodiments, methods and systems and provided to enhance Interactive Voice Response systems. Call flow information establishing a call flow having a predetermined ordering of a series of intended steps and one or more alternative steps for selected intended steps in the series of intended steps can be received. Users in the call flow advance from one intended step in the series of intended steps to another intended step in the series of intended steps based on any response other than one or more alternative valid responses for the one intended step that lead in the call flow to one or more alternative steps to the one intended step. A determination can be made whether to allow a user to proceed from a first intended step in the series of intended steps to a second intended step in the series of intended steps. Based on a determination to allow the user to proceed from a first intended step in the series of intended steps to a second intended step in the series of intended steps, a first set of one or more messages can be determined for the second intended step based on the call flow information. The first set of one or more messages can then be communicated to the user.

In some embodiments, based on a determination not to allow the user to proceed from a first intended step in the series of intended steps to a second intended step in the series of intended steps, a second set of one or more messages may be determined for an alternative step to the first intended step based on the call flow information. The second set of one or more messages then can be communicated to the user. A determination may be made then whether to allow the user to proceed from the alternative step to a third intended step in the series of intended steps.

In further embodiments, a determination whether to allow the user to proceed from a first intended step in the series of intended steps to a second intended step in the series of intended steps may include a determination whether the user provided any response other than one or more alternative valid responses to the first intended step that lead in the call flow to one or more alternative steps to the first intended step. A determination whether to allow the user to proceed from a first intended step in the series of intended steps to a second intended step in the series of intended steps may also include a determination whether a predetermined period of time has elapsed. A determination whether to allow the user to proceed from a first intended step in the series of intended steps to a second intended step in the series of intended steps may include a determination whether the user provided an alternative valid response to the first intended step that leads in the call flow to an alternative step to the first intended step. A determination whether to allow the user to proceed from a first intended step in the series of intended steps to a second intended step in the series of intended steps may further include a determination whether a response required by the second intended step is provided by information known or discovered about the user. A determination whether to allow the user to proceed from a first intended step in the series of intended steps to a second intended step in the series of intended steps may include a determination whether a response required by the second intended step is provided by one or more templates.

In still further embodiments, a determination whether to allow the user to proceed from a first intended step in the series of intended steps to a second intended step in the series of intended steps may include a determination that a first response provided by the user is unrecognizable. Instead of re-communicating one or more messages to the user for the first intended step, a third set of one or more messages may be communicated to the user. The third set of one or more messages may alert the user that the first response is unrecognizable. The third set of one or more messages may further alert the user that the user may continue in the call flow by providing a second response.

In some embodiments, a second set of one or more messages may be communicated to the user based on the call flow information. The second set of one or more messages may present at least a first option and a second option to the user. A determination may be made whether to proceed in the call flow with the first option. A determination may further be made whether a response provided by the user is indicative of a recognition error. Based on a determination that the response is indicative of a recognition error, a third set of one or more messages may be communicated to the user based on the call flow information. The second set of one or more messages may present at least the second option to the user without presenting the first option.

In further embodiments, tuning and accuracy data may be stored for a user during a first call. The user then may be recognized as a repeat caller during a second call. One or more user response recognition mechanisms may be tuned, adjusted, or have their accuracy increased to the user based on the stored tuning and accuracy data for the user.

A further understanding of the nature of and equivalents to the subject matter of this disclosure (as wells as any inherent or express advantages and improvements provided) should be realized by reference to the remaining portions of this disclosure, any accompanying drawings, and the claims in addition to the above section.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 7 depicts information that may be included in a user profile in one embodiment according to the present invention.

DETAILED DESCRIPTION OF THE INVENTION

The present invention relates to information systems. More specifically, the present invention relates to infrastructure and techniques for improving user experiences while using Interactive Voice Recognition-enabled applications.

In various embodiments, systems and methods are provided for optimizing and enhancing telephone call flows that build 'intent' into a call flow or navigation path.

The following terms and phrases may be used throughout the disclosure:

Automatic Speech Recognition (ASR): Hardware and/or software elements configured for recognizing a verbal utterance spoken by a user and matches the verbal utterance or a keyword associated with the verbal utterance to a transaction grammar.

Call Control: Hardware and/or software elements configured for receiving, initiating, and/or terminating telephone calls.

Directory Assistance (DA): One or more standard information services provided by telephone companies or other third parties for users to obtain directory assistance, may be accessed by dialing 411 in the United States.

Dual-tone multi-frequency (DTMF): A 'touch-tone' interface configured for signaling a call switching center during a call.

Interactive Voice Response (IVR): Hardware and/or software elements configured for translating verbal utterances of a user (e.g., spoken words or phrases) into actions, such as software commands and for providing feedback to the user, such as using recorded speech or text to speech software.

Public Land Mobile Network (PLMN): Any wireless communications system intended for use by terrestrial subscribers in vehicles or on foot. Usually interconnected with a PSTN.

Public Switched Telephone Network (PSTN): Any landline based telephone network. Also known as Plain Old Telephone System (POTS).

PSTN Gateway: Hardware and/or software elements configured for interfacing with a telephony network to connect telephone calls to an Internet protocol (IP) based enterprise application.

Text To Speech (TTS): Hardware and/or software elements configured for translating written text into audio output that simulates human speech.

Voice over IP (VOIP): Hardware and/or software elements configured for transmitting voice data over IP networks.

Voice User Interface (VUI): Hardware and/or software elements configured for providing interactions between a user and a computer program in order to operate the computer program and receive feedback or information from the computer program.

Voice eXtensible Markup Language (VXML): Any markup language that enables software developers to quickly develop voice user interfaces for telecommunications systems.

In order to better understand one or more of the inventions presented within this disclosure, aspects of at least one environment within which various embodiments may operate will first be described.

Figure 1:
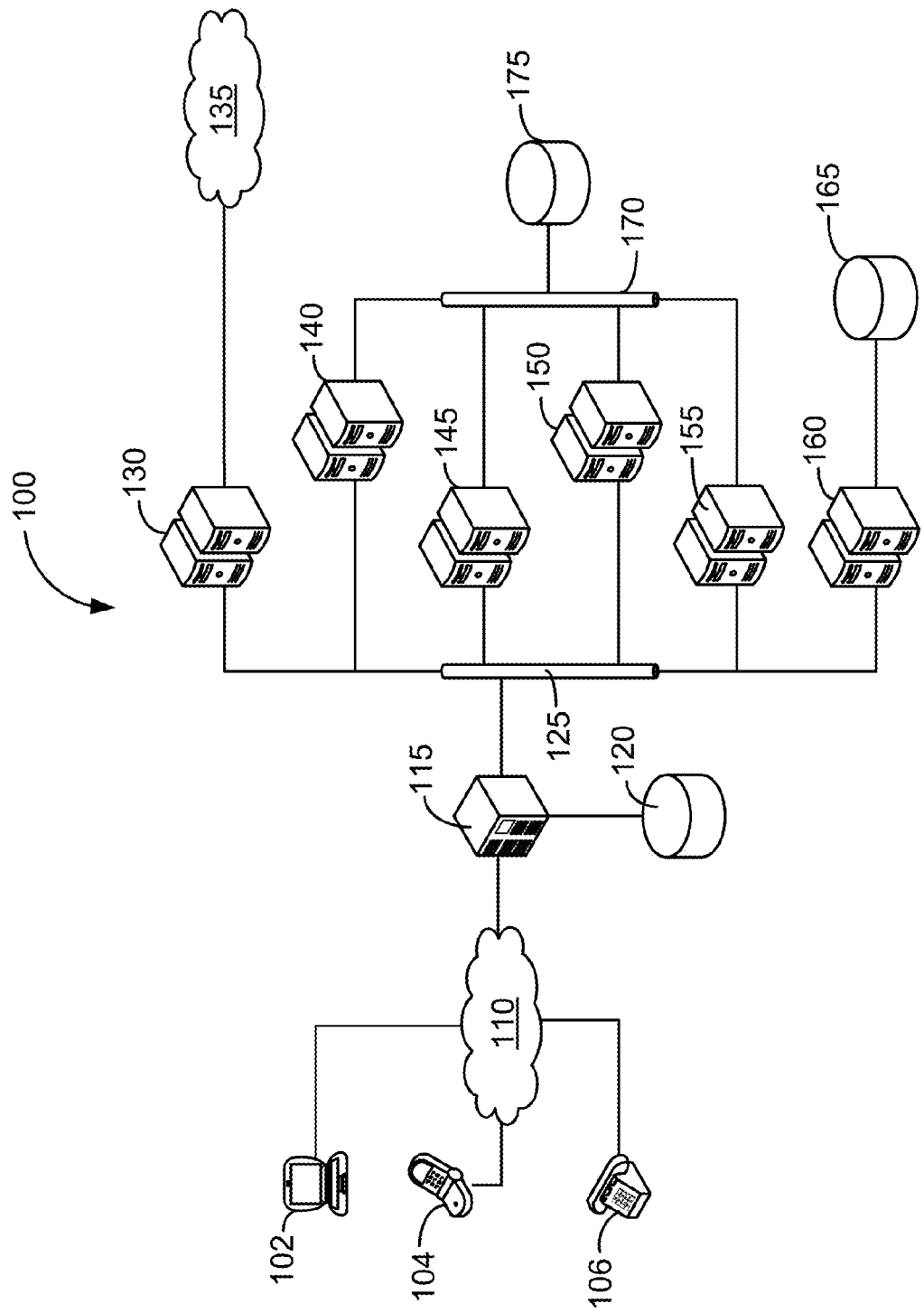
FIG. 1 illustrates an information system that may incorporate embodiments of the present invention.

FIG. 1 illustrates information system 100 that may incorporate embodiments of the present invention. In this example, system 100 includes laptop computer 102, mobile device 104, telephone 106, communications network 110, voice portal 115, transaction grammar and media storage 120, network link 125, comparison shopping (CS) application server 130, communications network 135, advertising (ADS) application server 140, personal information manager (PIM) application server 145, user profile (UPS) application server 150, location-based (LBS) application server 155, directory assistance (DA) application server 160, directory information storage 165, network link 170, and storage 175.

Communications network 110 is linked to laptop computer 102, mobile device 104, telephone 106, and voice portal 115. Voice portal 115 is linked to transaction grammar and media storage 120. Network link 125 is linked to CS application server 130, ADS application server 140, PIM application server 145, UPS application server 150, location-based (LBS) application server 155, and DA application server 160. CS application server 130 is linked to communication network 135. DA application server 160 is linked to directory information storage 165. Network link 175 is linked to ADS application server 140, PIM application server 145, UPS application server 150, LBS application server 155, and storage 175.

Laptop computer 102 is intended to represent any computing device or computer system, such as desktops, workstations, notebooks, laptops, portable and ultra-portable computers, thin-clients, and the like. Mobile device 104 is intended to represent any mobile or handheld computing device, such as mobile phones, personal digital assistants (PDS), smartphones, pagers, and the like. Telephone 106 is intended to represent landline phones and traditional non-mobile communication devices.

Communications network 110 provides calls, sessions, connections, and the like between laptop computer 102, mobile device 104, and telephone 106 and voice portal 115. Some examples of communications network 110 are POTS/ PSTN networks, PLMN networks, cellular networks, the Internet, Wifi and WiMax networks, private and public networks, VOIP networks, and the like. One example of communications network 135 is the Internet.

Voice portal 115 can include hardware and/or software elements configured for providing VUI and IVR interactions. CS application server 130 can include hardware and/or software elements configured for comparison shopping. For example, CS application server 130 may accessing data to perform travel related comparison shopping, product comparison shopping, and execute comparison shopping transactions.

ADS application server 140 can include hardware and/or software elements configured for providing ads to users of voice portal 115 based on verbal input of the user. PIM application server 145 can include hardware and/or software elements configured for providing unified messaging. Some examples of unified message include offering IVR enabled access to voice mail, TTS rendering of e-mail and text messages, or the like.

UPS application server 150 can include hardware and/or software elements configured for storing user profile/user preference data. User profile data can include information associated with a user or caller, such as a telephone number, IP or network address, billing information, shipping information, or the like. LBS application server 155 can include hardware and/or software elements configured for providing location based services, such as global positioning (GPS) or the like. DA application server 160 can include hardware and/or software elements configured for providing directory assistance information.

In one example of operation, system 100 provides a user of laptop computer 102, mobile device 104, and telephone 106, access to the Internet for information that is relevant or associated with the user's specific queries or request(s). In general, system 100 receives input from a user. The input from the user may be verbal input or utterances, spoken words or phrases, a cough or sneeze, touch tones, mouse clicks, stylus presses, key presses, and the like.

System 100 then analyzes the input from the user, such as verbal utterances, to determine one or more transactions grammars. A transaction grammar can include information that defines one or more messages related to a category, such as travel, product information, driving directions, and the like. In general, system 100 matches one or more keywords or phrases uttered by a user to a transaction grammar, and conveys messages to the user based on the transaction grammar.

The messages defined by a transaction grammar may indicate information related the category, offers to perform tasks for the user that are related to the category, offers to initiate or consummate category specific transactions, or deliver advertisements associated with the category. The messages may be static, such as prerecorded product information, or dynamically generated, such as using TTS.

For example, in response to a verbal request from a user for a listing associated with "United Airlines," system 100 may determine a transaction grammar related to travel or airfares. In another example, system 100 delivers messages indicating content relevant information and advertising based on a transaction grammar associated with the user's queries or requests.

The following illustrates one example of an exchange between a user and system 100:

System 100: "What city please?"
User: "San Francisco"
System 100: "What listing please?"
User: "United Airlines"

System 100 determines a transaction grammar related to the phrase "United Airlines," and conveys a message to the user based on the transaction grammar.

System 100: "Would you like me to help you find the lowest price for an itinerary?"

User: "No"

System 100 determines another messages based on the transaction grammar, and conveys the message to the user.

System 100: "Did you know American Airlines will give you 5000 extra travel miles if you connect to them now and purchase your ticket today. Would you like me to connect you to American Airlines instead of United Airlines?"

In various embodiments, system 100 provide users with valuable tools and features such as comparison-shopping, bidding features for products or services, receive status of bids that are transaction enabled, access product reviews, order and pay for goods and services using primarily voice commands via voice portal 115.

In some embodiments, system 100 provides standard calendaring, tasks based on itinerary, hotel confirmation, and the like, and messages indicating other organic factors, such as traffic conditions, flight delays, and actual user location.

In some embodiments, system 100 provides merchants with tools that will help influence and potentially redirect a highly qualified prospect's buying decision based on queries and/or requests made by the user in the past or in real time. In addition, special offers can be made based on the same or additional queries or requests for information. System 100 saves profiles of users' call data (e.g., using application server 150) and utilizes location sensitive data and user utterances to narrow and qualify the users' preferences. In some embodiments, system 100 stores the data as a component of PIM application server 145 for faster data mining, identifying, and setting user preferences, as well as for performing specific tasks for the user based on past experiences and in real time.

Figure 2:
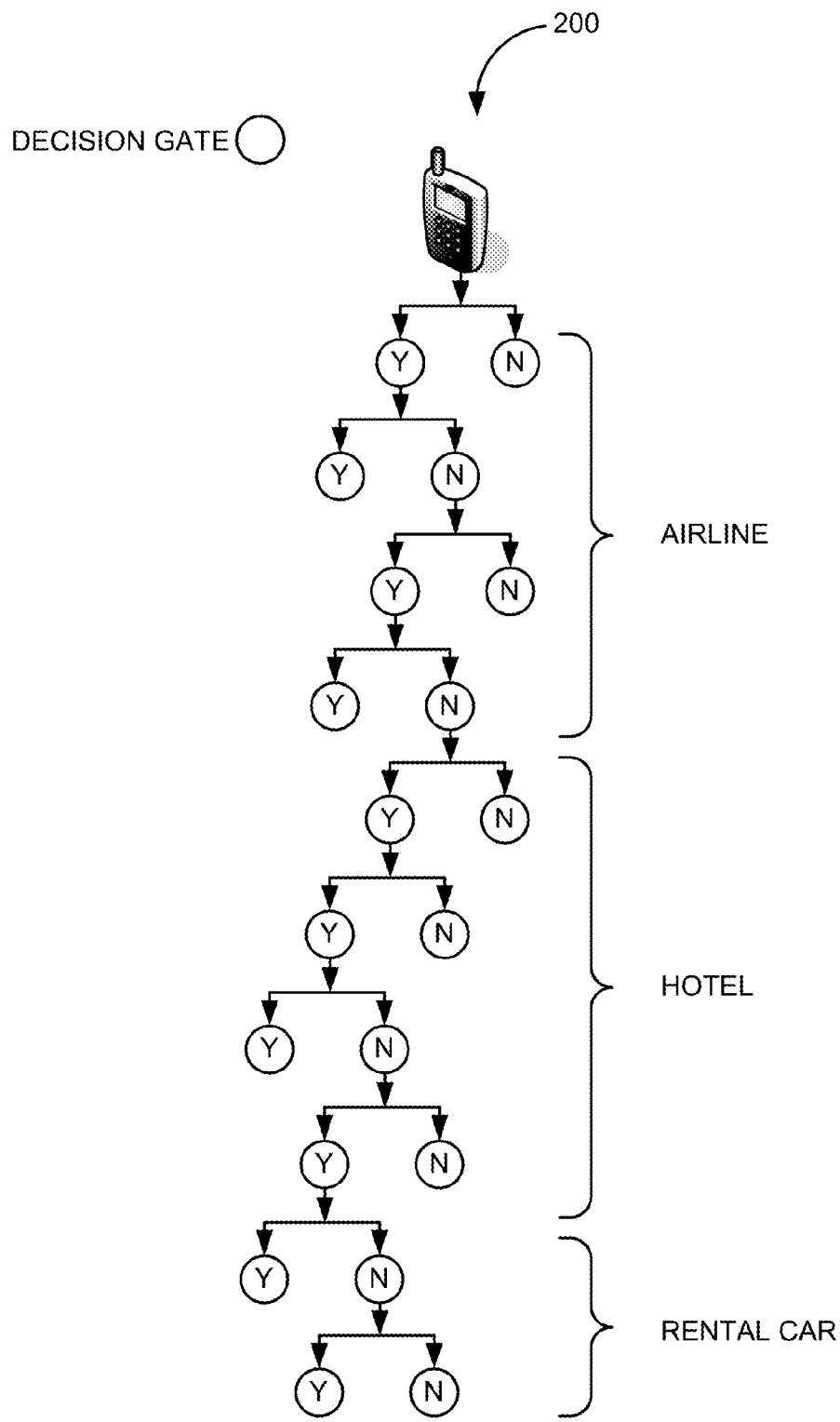
FIG. 2 depicts a non-optimized call flow in one embodiment according to the present invention.

FIG. 2 depicts non-optimized call flow 200 in one embodiment according to the present invention. In a typical voice application that uses IVR, there are a series of options from which a user must choose, for example "Yes/No." The two options may be thought of as acting like 'doors'. One of the two doors is opened by a verbal response. Only certain, specific responses then allow a user to move forward in the call flow; and each of the options has a different call path. Within an IVR, the caller responses must match one of the entries in a grammar file, otherwise the call flow will fail until the caller's response matches one of these entries in the grammar files. In a standard IVR system, the caller's answer to e.g. "Would you like to find the lowest fare?", must be one of the items in a grammar file for the response (i.e. Yes/No).

While using standard IVR enabled applications, a user could easily get frustrated if they are not able to get a quick answer to a specific query. This has happened to many of us while using such a system; the result was either a quick disconnect or pressing "0" to speak to a customer support representative, thus either losing revenue or incurring additional cost. For a more complicated call flow, such as purchasing an airline ticket, any frustration could easily prove to be a deterrent for the caller unless the system is designed properly.

Figure 3:
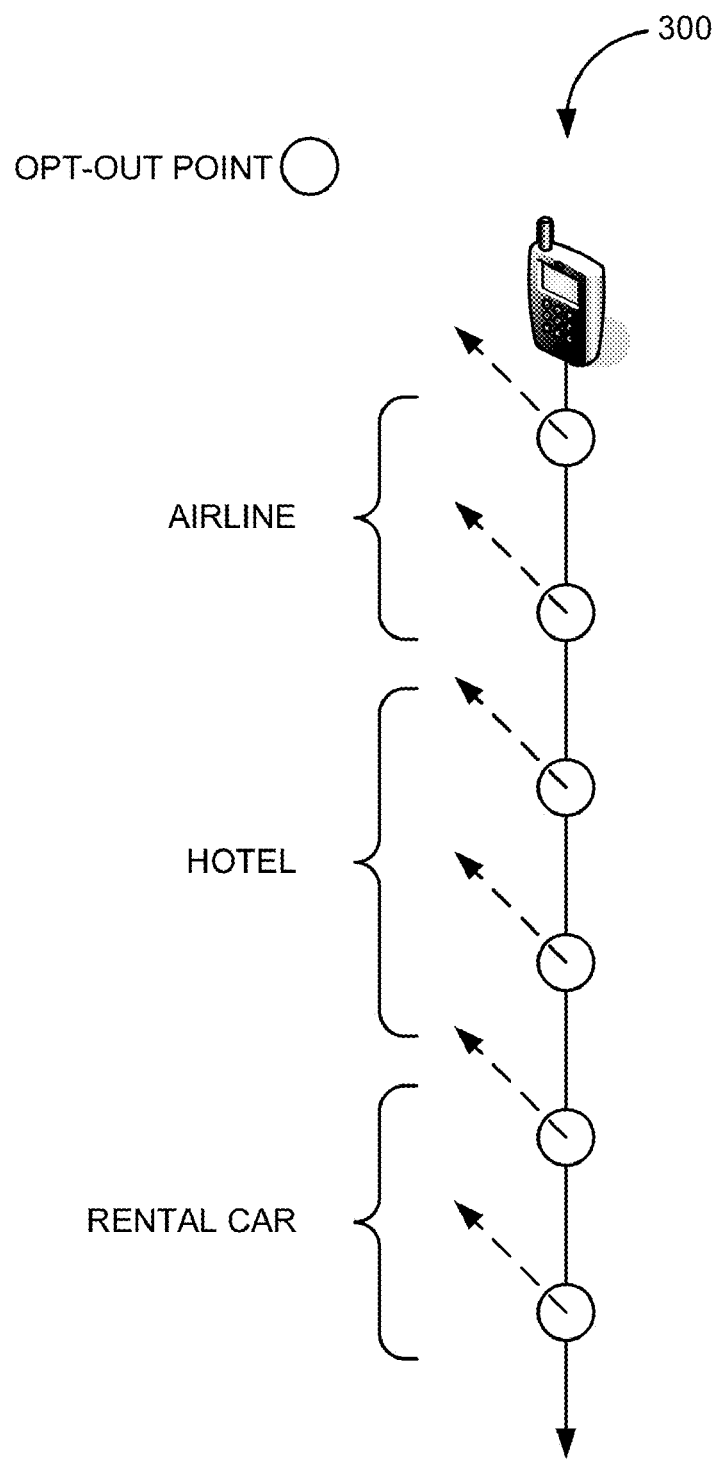
FIG. 3 depicts an optimized call flow in one embodiment according to the present invention.

In various embodiments, system 100 optimized call flows using one or more techniques that streamline the call flows by building "intent" into navigation paths where every action motivates users to follow paths. FIG. 3 depicts optimized call flow 300 in one embodiment according to the present invention. System 100 may employ "Intuitive Voice Navigation (IVN)" which acts in synch with IVR. However, the chief differentiator for IVN is that one door remains open. IVN may be likened to a vehicle with an automatic transmission; whereas IVR is like a standard transmission, which uses the clutch to move through the gears one at a time. With IVN, exact response matches are not required in order to move the call forward through the call flow. So, in the initial Yes/No response scenario, if the system 100 'hears' nothing, or hears anything other than a negative utterance, the caller moves forward on the "Yes" path. System 100 also allows the caller to go back at any point, and interact with system 100 in a more varied, semantically intuitive manner.

The following explanations of operation take as a canonical example the voice user dialogue associated with booking an airline ticket using system 100. In theory, there are just four utterances in a call flow offered by system 100 for a call to move forward. These can be: City and State of departure; City and State of destination; Date of departure; Date of return. Every other choice be supplied by other optimizations implemented by system 100.

In various embodiments, system 100 creates a call path of least resistance by making certain assumptions. In one embodiment, system 100 may make a determination or assumption where 80% of calls are going. Accordingly, system 100, may at any time update or modify call flow assumptions because a call should always be made to take the path of least resistance. For example, when a caller requests a destination City that has multiple airports, system 100 can assume a specific destination based on airport traffic. This has several advantages:

1. There is no need to create or load ASR grammar files for all variations of all the City's local airports.
2. Only the grammar files for the "No" path need to be programmed. These become the only relevant files for the call flow.
3. By eliminating grammar files, the accuracy is greatly improved (the failure rate is greatly diminished).
4. If one airport has the greatest airport traffic for a City, then system 100 can deduce that airport is the caller's intended destination.
5. System 100 further confirms its deductions, and, if incorrect, options for "Go back" are available.

For example, in the case of New York City that has three airports: JFK receives 70% of traffic; La Guardia receives 10% of traffic; Newark receives 20% of traffic. System 100 may optimize certain call flows such that JFK becomes a default airport choice because the traffic is greatest to JFK. For utterances other then permutations of La Guardia or Newark, system 100 will assume JFK. If the assumption is incorrect, in some embodiments, system 100 allows a caller says "Go Back". Because the current default response (JFK) is not the required answer, system 100 then assumes that the airport with the second largest amount of traffic (Newark) will become the default. In addition, because of the assumptions, a caller can conceivably go through a call flow without ever making a response, other than any initial required or seed utterances.

Accordingly, because of these deductions and assumptions, system 100 can operate in various embodiments without (large) grammar files for every utterance, or for every airport name combination. System 100 though may include, for longer or more complicated utterances, allowances for the addition of grammar files and phonetic pronunciation variants. Therefore, system 100 implements various methods and processes to make a call flow more accurate, more concise, and need less user input; all of which could lead to more successful transactions and better user satisfaction. Aspects of an enhanced user experience can include shorter responses, or even removing the need to respond, in an intuitive way; pre-defined information automatically filled in for the user based on their pattern of system usage or the context in which the system is being used, and mechanisms that enable experienced 'power' users to use the system in an expedited way. System 100, in some embodiment, can lower call failure rates; decrease call duration, and lower call center impact because of greater call flow success.

In further embodiments, system 100 addresses one or more fundamental speech/voice user interface (VUI) design principles, such as:
1. "Prompts should guide natural responses into the appropriate vocabulary.
2. Assume the caller does not know the active vocabulary; guide the caller towards answers that maximize clarity and unambiguousness."

To this end, in some embodiments, system 100 enables the pronunciation of terms and phrases (e.g., airport names) in prompts and confirmation messages to be recorded by a voice talent, or produced by text-to-speech (TTS) with as much clarity and accuracy as possible, both in terms of the individual sounds and the stress on the syllables of the names. This will guide the user (who may be a non-native speaker of American English, or speak with a strong regional accent) to a clearer or less ambiguous pronunciation when first answering the IVR questions. Confusion or mis-recognition of ambiguous City and Airport Names might thus be avoided, so the user does not have to repeat the names several times, or travel to the wrong destination! Such ambiguous well-known pairs include:
1. Austin vs. Boston
2. Dallas vs. Dulles
3. Auckland vs. Oakland
4. San Jose, Calif. vs. San Jose, Costa Rica Therefore, system 100, in some embodiments, guide a caller to use these correct, full City and Airport names to enhance the accuracy of an ASR system.

In further embodiments, system 100 may provide adaptive speech recognition functionality. In the event of a caller being consistently misrecognized, and failing to progress through the call-flow, system 100 may switch that caller to a more 'customized', speaker-dependent ASR path within the call flow. If, for example, a caller with a strong Indian English accent repeatedly says Dullas (d uh l ax s), Texas, when intending Dallas (d ae l ax s), Texas, system 100 may detect this failed recognition and send the caller down a new recognition path, with adaptive grammar/pronunciation files loaded.

In various embodiments, system 100 can provide an 'Opt-out' default. In one example, if a caller hears an advertisement, the caller can choose to opt out of a transfer of the call to a partner. Thus, system 100 may offer a value proposition with an opt-out. An example of a 'opt-out' scenario can include:
1. A caller hears a value proposition that includes a request for a call transfer.
2. Unless the caller chooses not to connect by hanging up, the call will transfer to a partner.

Opt-out can be a value proposition which offers the caller something of value (e.g. a free appetizer at a restaurant in the destination city, or a free night's accommodation at a hotel in the destination city), and will be received specifically unless the caller hangs up. In one embodiment, opt-out happens at the end of the call, and may be context-dependent, i.e. it is directly correlated with the transaction the caller just completed, and because the functionality essentially redirects the call to a sponsor.

In still further embodiments, system 100 may provide the ability to resurrect 'dead' telephone numbers. If a caller has dialed 411 for e.g., John Smith Plumbing, and the plumber has either gone out of business or moved location, then system 100 may optimize a call flow with several options or scenarios. Some examples can include:
1. The general 'semantic group' plumbing is recognized, and the carrier/application redirects the caller to an alternative plumber's listing and number.
2. The old number is recognized as having a specific location from the area code or telephone prefix, and a new active number is suggested for transfer.
3. Businesses listing in the Yellow Pages pay an additional premium to have the call re-routed to their 'inheritor' or preferred substitute vendor, and IVN informs the caller that is happening.

Figure 4:
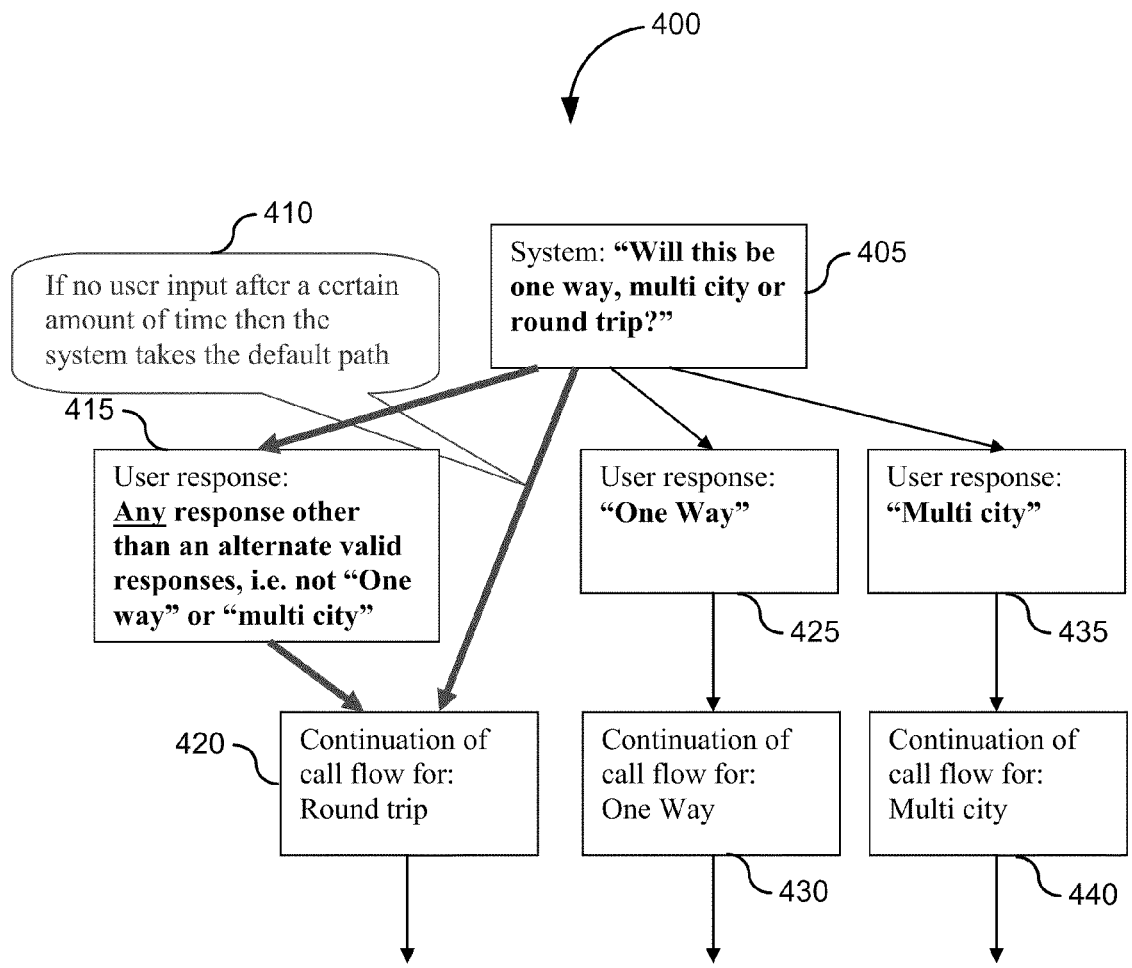
FIG. 4 is a flowchart of a method for optimizing a call flow using a default answer in one embodiment according to the present invention.

FIG. 4 is a flowchart of a method 400 for optimizing a call flow using a default answer in one embodiment according to the present invention. The processing of method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 405.

In various embodiments, system 100 can optimize call flows based on "default answers." Default answers can include a choice in a call flow that would be accepted with one of two answers: either no answer or any answer except a valid answer that chooses a non-default path. Default answers can be determined based on statistical information, usage information, hierarchical information, or other criteria for determining an ordering or priority between at least two choices. For example, in step 405, system 100 when prompting for airline reservation information might prompt: "Will this be a one way, round trip, or multi city trip?" If "round trip" is chosen as the default path, for example because it is the most common request, then if no user input is provided after a certain period of time in step 410, system 100 takes the default path. In another example, if "round trip", "return fare", "yes", or "peanut butter and jelly" were spoken in step 415, or nothing was said as in step 410, system 100 will take the round trip path and continue with the call flow in step 420. In another example, if "round trip" is chosen as the default path, then system 100 will take the round trip path and continue with the call flow in step 420 if anything other than "one way" or "multi city" was said. If "one way" was spoken in step 425, then in step 430, system 100 would take the "one way" path and continue with the call flow in step 430. If "multi city" was spoken in step 435, then in step 440, system 100 would take the "multi city" path and continue with the call flow in step 440.

Figure 5:
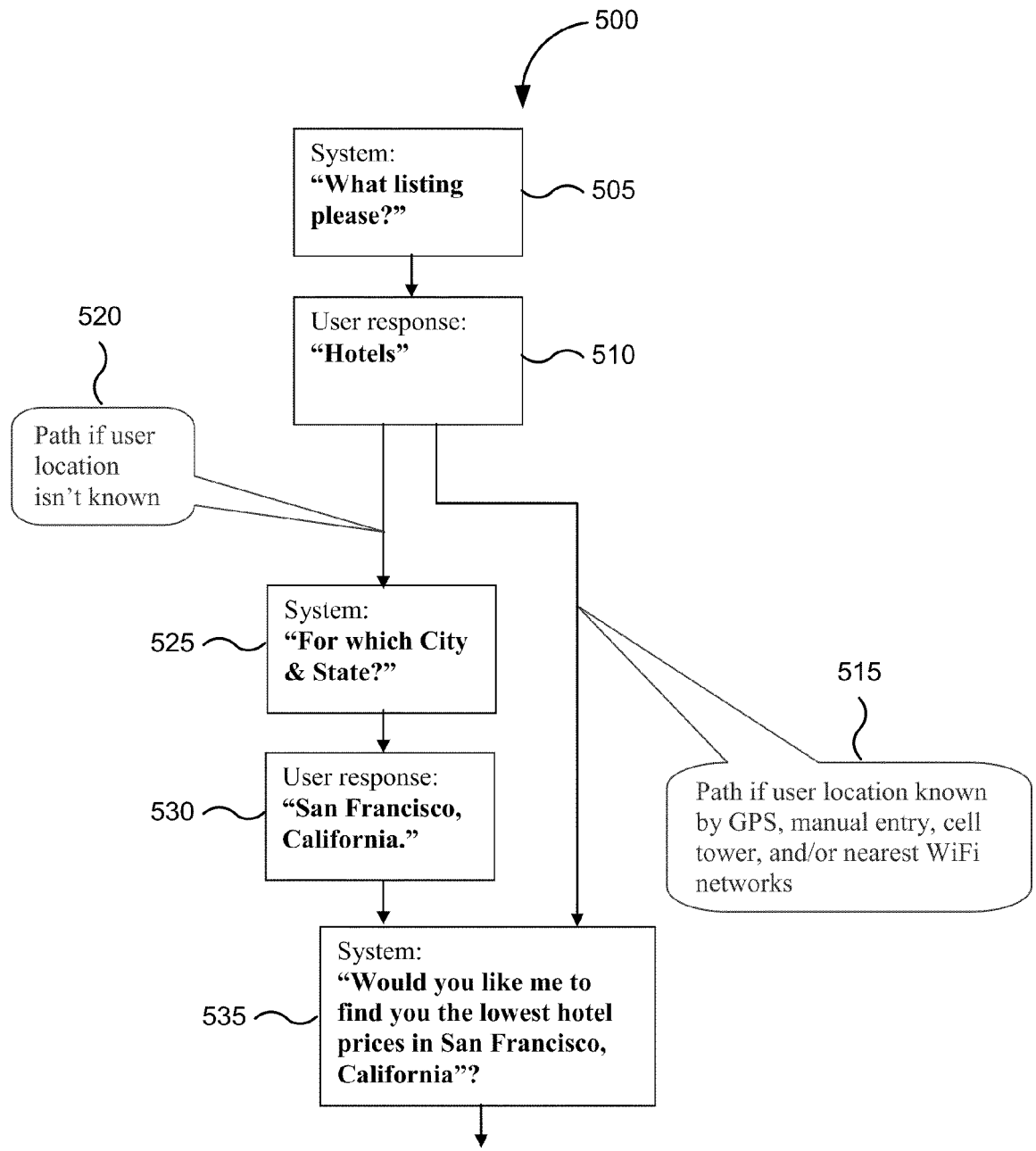
FIG. 5 is a flowchart of a method for optimizing a call flow based on contextual information in one embodiment according to the present invention.

FIG. 5 is a flowchart of method 500 for optimizing a call flow based on contextual information in one embodiment according to the present invention. The processing of method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 505.

In various embodiments, system 100 can optimize call flows would be based on context-based information. Context-based information can include information known or determined about an entity, such as a user. Some examples of information known or discovered about the entity can include location information, caller ID information, user responses to system questions, or the like. For example, in step 505, system 100 may prompt: "What listing please?" In step 510, the user may respond: "Hotels". In step 515, system 100 may optimize the call flow if system 100 determines the user's location, such as from GPS data, manual data, triangulation data, from cell tower or WiFi data, or the like. In this example, system 100 may already have gleaned or stored the user's location, the user's position in the call flow, and time of day or year. If system 100 knew the user was in San Francisco and the user asked for hotels, system 100 can adjust the call flow to find hotels in San Francisco as the default. Additionally, system 100 may determine that if hotels were asked for as part of booking a trip then hotels are likely needed at the destination city, no matter the location of the user.

In step 520, if the user's location is not know or discoverable, system 100 prompts: "For which City and State?" In step 530, the user responds: "San Francisco, Calif." Using either the optimized call flow or the non-optimized call flow, in step 535, system 100 prompts: "Would you like me to find you the lowest hotel prices in San Francisco, Calif."

Figure 6:
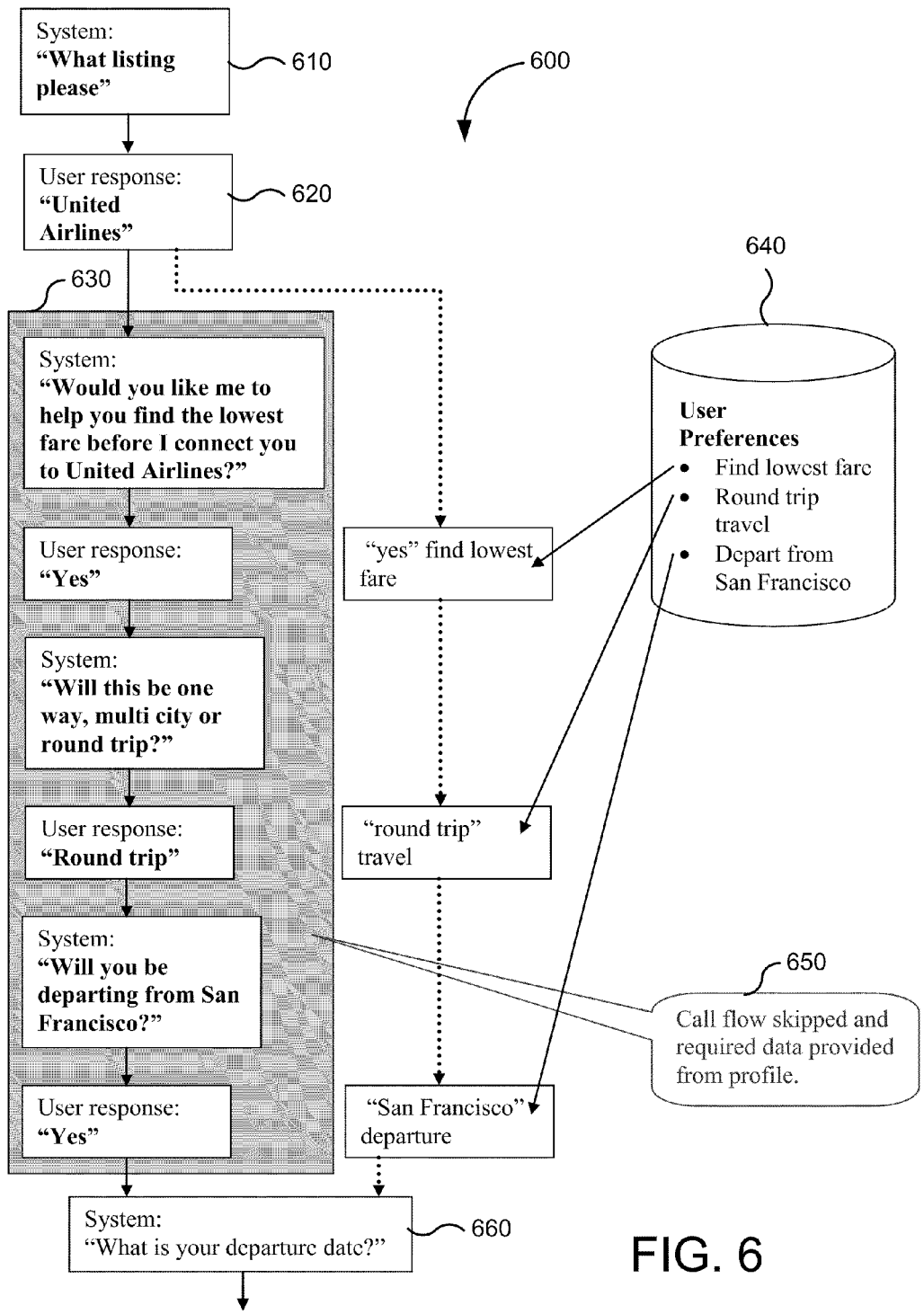
FIG. 6 is a flowchart of a method for optimizing a call flow based on user profile/user preference information in one embodiment according to the present invention.

FIG. 6 is a flowchart of method 600 for optimizing a call flow based on user profile/user preference information in one embodiment according to the present invention. The processing of method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610. Method 600 includes steps 620-660, and ends in step 660. One example of how system 100 optimizes a call flow based on a user's profile using method 600 is presented in Table 1 where two versions of a call flow are compared. FIG. 7 depicts information 700 that may be included in a user profile in one embodiment according to the present invention.

In various embodiments, system 100 may optimize call flows based on user profiles and/or user preferences. User Profiles/Preferences can be based on a caller's repeat behavior patterns. These patterns (preferences) can be used to automatically supply input to a call flow and/or auto-populate answers, such as the details for a trip. Preferences could be accumulated over time or entered manually by the user. For example, a preference could be: a user usually starts a trip from SFO airport; or that the user prefers to start trips to the East Coast around mid-day.

The two call flows are compared below. The comments column indicates where the user profile can be used to save time, reduce the number user inputs, and therefore improve reliability. The use of a profile could also customize the call flow. All these components may improve user satisfaction, and encourage them to stay within the call flow.

TABLE 1

| Non-optimized Call Flow | Optimized Call Flow | Comments |
|---|---|---|
| Welcome to directory information services. | Welcome John to directory information services. | <Personalized from profile> |
| What city & state please? | What city & state please? | |
| [response] San Francisco, California. | [response] San Francisco, California. | |
| What listing please? | What listing please? | |
| [response] United Airlines | [response] United Airlines. | |
| Would you like me to help you find the lowest fare before I connect you to United Airlines? | <IVN process> | <time saved due to profile preference> |
| [response] Yes. | | |
| Will this be one way, multi city or round trip? | <IVN process> | <time saved due to profile preference> |
| [response] Round trip. | | |
| Will you be departing from San Francisco? | <IVN process> | <time saved due to profile preference> |
| [response] Yes. | | |
| What is your departure date? | What is your departure date? | |
| [response] October $11^{th.}$ | [response] October $11^{th}$. | |
| What is your destination city or airport? | What is your destination city or airport? | |
| [response] JFK. | [response] JFK. | |
| What is your return date? | What is your return date? | |
| [response] October $15^{th}$. | [response] October $15^{th}$. | |
| Let me summarize your travel plans; you are traveling from San Francisco on October 11th to New York, returning on October 15th. If this is not correct please say "Go back". | Let me summarize your travel plans; you are traveling from San Francisco on October 11th to New York, returning on October 15th. If this is not correct please say "go back". | |
| One moment while I find you the lowest fare from San Francisco to New York. | One moment while I find you the lowest fare from San Francisco to New York. | |
| [response] <hold music> | [response] <hold music> | |
| During your stay in New York The New York Marriott would like to offer you a 5 star hotel room that is normally 369 dollars for only 145 dollars a night, checking in on October 11th and checking out on October $15^{th.}$ | During your stay in New York The New York Marriott would like to offer you a 5 star hotel room that is normally 369 dollars for only 145 dollars a night, checking in on October 11th and checking out on October $15^{th.}$ | |

TABLE 1-continued

| Non-optimized Call Flow | Optimized Call Flow | Comments |
| --- | --- | --- |
| Would you like to take advantage of this special offer? | Would you like to take advantage of this special offer? | |
| [response] Yes. | [response] Yes. | |
| [response] <hold music> | [response] <hold music> | |
| The lowest fares are brought to you by Expedia. | The lowest fares are brought to you by Expedia. | |
| There are 16 lowest fares on October 11$^{th}$. To narrow the list of selections please specify the time of day you would like to depart or say "all" to hear the entire list of flights. | <IVN process> | <time saved due to profile preference> |
| [response] mid-day | | |
| A flight on Continental airlines departs at 12:50 pm. | A flight on Continental airlines departs at 12:50 pm. | |
| A flight on Jet Blue airlines departs at 1:25 pm. | A flight on Jet Blue airlines departs at 1:25 pm. | |
| and a flight on Continental airlines departs at 2:20 pm | and a flight on Continental airlines departs at 2:20 pm | |
| Which departure time would you like? To hear earlier or later times say "earlier" or "later". | Which departure time would you like? To hear earlier or later times say "earlier" or "later" | |
| [response] 12:50 | [response] 12:50. | |
| There are 6 Continental airline fares on October 11$^{th}$. To narrow the list of selections please specify the time of day you would like to depart or say "all" to hear the entire list of flights. | <IVN process> | <time saved due to profile preference> |
| [response] evening | | |
| Continental airlines flights depart at 6:15 pm, 8:20 pm and 11:55 pm. Which departure time would you like? To hear earlier or later times say "earlier" or "later" | Continental airlines flights depart at 6:15 pm, 8:20 pm and 11:55 pm. Which departure time would you like? To hear earlier or later times say "earlier" or "later" | |
| [response] 8:20. | [response] 8:20. | |
| The lowest fare from San Francisco to New York is on Continental Airlines for 132 dollars. | The lowest fare from San Francisco to New York is on Continental Airlines for 132 dollars. | |
| Your requested airline, United Airlines, has a fare of 416 dollars | Your requested airline, United Airlines, has a fare of 416 dollars | |
| For the lowest fare simply say Continental Airlines. | For the lowest fare simply say Continental Airlines. | |
| For your requested airline, simply say United Airlines. | For your requested airline, simply say United Airlines. | |
| For flight details simply say flight details. | For flight details simply say flight details. | |
| To name your own price and save even more simply say PriceLine. | To name your own price and save even more simply say PriceLine. | |
| [response] flight details | [response] flight details | |
| Your departure is on Continental Airlines flight 220 Non-stop, departing from San Francisco at 6:30 am on Friday, October 11th arriving in New York at 8:37 am | Your departure is on Continental Airlines flight 220 Non-stop, departing from San Francisco at 6:30 am on Friday, October 11th arriving in New York at 8:37 am | |
| Your return is on Continental Airlines flight 301 Non-stop, departing from New York at 9:30 am on Tuesday, October 15th arriving in San Francisco at 11:30 am. | Your return is on Continental Airlines flight 301 Non-stop, departing from New York at 9:30 am on Tuesday, October 15th arriving in San Francisco at 11:30 am. | |
| For the lowest fare simply say Continental Airlines. | For the lowest fare simply say Continental Airlines. | |
| For your requested airline, simply say United Airlines. | For your requested airline, simply say United Airlines. | |
| For more flight details simply say flight details. | For more flight details simply say flight details. | |
| To name your own price and save even more simply say PriceLine. | To name your own price and save even more simply say PriceLine. | |
| [response] Continental Airlines. | [response] Continental Airlines. | |
| Your requested airline, United Airlines, would like to match the lowest fare. | Your requested airline, United Airlines, would like to match the lowest fare. | |
| Would you like to be connected to your requested airline? | Would you like to be connected to your requested airline? | |
| [response] Yes. | [response] Yes. | |
| Thank you for using SpeakSoft Directory Assistance. | Thank you for using SpeakSoft Directory Assistance. | |
| We will now connect you to United Airlines. | We will now connect you to United Airlines. | |

Figure 8:
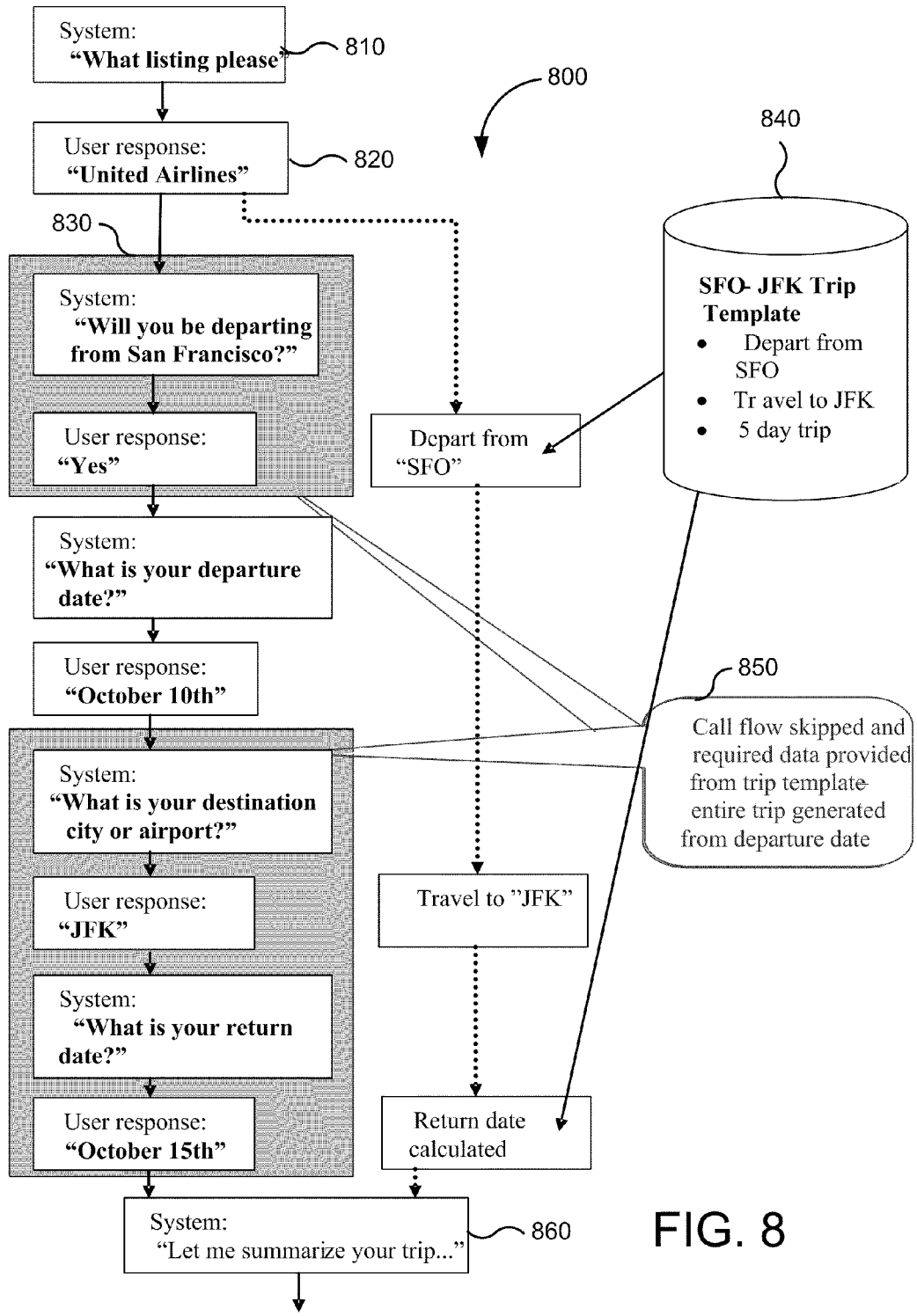
FIG. 8 is a flowchart of a method for optimizing a call flow based on template information in one embodiment according to the present invention.

FIG. 8 is a flowchart of method 800 for optimizing a call flow based on template information in one embodiment according to the present invention. The processing of method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810. Method 800 includes steps 820-860, and ends in step 860. One example of how system 100 optimizes a call flow based on template information using method 800 is presented in Table 2 where two versions of a call flow are compared.

In various embodiments, system 100 may optimize call flows based on one or more templates. Templates can include template information provided, for example, by a user or based on a caller's repeat behavior patterns. These templates can be used to automatically supply input to a call flow and/or auto-populate answers, such as the details for a trip. Template information could be accumulated over time or entered manually by the user. For example, a template could be: a user frequently visits a branch office of their company in a certain city, and the trip usually lasts five days.

The two call flows are compared below. The comments column indicates where templates can be used to save time, reduce the number user inputs, and therefore improve reliability. The use of a profile could also customize the call flow. All these components may improve user satisfaction, and encourage them to stay within the call flow.

TABLE 2

| Existing call flow | Call flow using Profile trip template optimization | Comments |
|---|---|---|
| Welcome to directory information services. | Welcome John to directory information services. | <Personalized from profile> |
| What city & state please? | What city & state please? | <If there is only one template in the profile there is no need to ask for the template name> |
| [response] San Francisco, California. | [response] Template trip. | |
| What listing please? | <IVN process> | <time saved due to template> |
| [response] United Airlines. | | |
| Would you like me to help you find the lowest fare before I connect you to United Airlines? | <IVN process> | <time saved due to template> |
| [response] Yes. | | |
| Will this be one way, multi city or round trip? | <IVN process> | <time saved due to profile preference> |
| [response] Round trip. | | |
| Will you be departing from San Francisco? | <IVN process> | <time saved due to template> |
| [response] Yes, | | |
| What is your departure date? | What is your departure date? | |
| [response] October 11$^{th}$. | [response] October 11$^{th}$. | |
| What is your destination city or airport? | <IVN process> | <time saved due to template> |
| [response] JFK. | | |
| What is your return date? | <IVN process> | <time saved due to template> |
| [response] October 15$^{th.}$ | | |
| Let me summarize your travel plans; you are traveling from San Francisco on October 11th to New York, returning on October 15th. If this is not correct please say "go back". One moment while I find you the lowest fare from San Francisco to New York. | Let me summarize your travel plans; you are traveling from San Francisco on October 11th to New York, returning on October 15th. If this is not correct please say "go back". One moment while I find you the lowest fare from San Francisco to New York. | |
| [response] <hold music> | [response] <hold music> | |
| During your stay in New York The New York Marriott would like to offer you a 5 star hotel room that is normally 369 dollars for only 145 dollars a night, checking in on October 11th and checking out on October 15$^{th}$. Would you like to take advantage of this special offer? | During your stay in New York The New York Marriott would like to offer you a 5 star hotel room that is normally 369 dollars for only 145 dollars a night, checking in on October 11th and checking out on October 15$^{th}$. Would you like to take advantage of this special offer? | |
| [response] Yes. | [response] Yes. | |
| [response] <hold music> | [response] <hold music> | |
| The lowest fares are brought to you by Expedia. | The lowest fares are brought to you by Expedia. | |

TABLE 2-continued

| Existing call flow | Call flow using Profile trip template optimization | Comments |
| --- | --- | --- |
| There are 16 lowest fares on October 11th. To narrow the list of selections please specify the time of day you would like to depart or say "all" to hear the entire list of flights. [response] Mid-day. | <IVN process> | <time saved due to profile preference> |
| A flight on Continental airlines departs at 12:50 pm a flight on Jet Blue airlines departs at 1:25 pm and a flight on Continental airlines departs at 2:20 pm Which departure time would you like? To hear earlier or later times say "earlier" or "later" [response] 12:50 12:50 pm | A flight on Continental airlines departs at 12:50 pm a flight on Jet Blue airlines departs at 1:25 pm and a flight on Continental airlines departs at 2:20 pm Which departure time would you like? To hear earlier or later times say "earlier" or "later" [response] 12:50 12:50 pm | |
| There are 6 Continental airline fares on October 11th. To narrow the list of selections please specify the time of day you would like to depart or say "all" to hear the entire list of flights. [response] evening | <IVN process> | <time saved due to profile preference> |
| Continental airlines flights depart at 6:15 pm, 8:20 pm and 11:55 pm. Which departure time would you like? To hear earlier or later times say "earlier" or "later" [response] 8:20 8:20 pm | Continental airlines flights depart at 6:15 pm, 8:20 pm and 11:55 pm. Which departure time would you like? To hear earlier or later times say "earlier" or "later" [response] 8:20 8:20 pm | |
| The lowest fare from San Francisco to New York is on Continental Airlines for 132 dollars Your requested airline, United Airlines, has a fare of 416 dollars For the lowest fare simply say Continental Airlines. For your requested airline, simply say United Airlines. For flight details simply say flight details. To name your own price and save even more simply say PriceLine. [response] flight details | The lowest fare from San Francisco to New York is on Continental Airlines for 132 dollars Your requested airline, United Airlines, has a fare of 416 dollars For the lowest fare simply say Continental Airlines. For your requested airline, simply say United Airlines. For flight details simply say flight details. To name your own price and save even more simply say PriceLine. [response] flight details | |
| Your departure is on Continental Airlines flight 220 Non-stop, departing from San Francisco at 12:50 pm on Monday, October 11th arriving in New York at 9:37 pm Your return is on Continental Airlines flight 301 Non-stop, departing from New York at 8:30 pm on Friday, October 15th arriving in San Francisco at 11:10 pm For the lowest fare simply say Continental Airlines For your requested airline, simply say United Airlines For more flight details simply say flight details To name your own price and save even more simply say PriceLine [response] Continental Airlines | Your departure is on Continental Airlines flight 220 Non-stop, departing from San Francisco at 12:50 pm on Monday, October 11th arriving in New York at 9:37 pm Your return is on Continental Airlines flight 301 Non-stop, departing from New York at 8:30 pm on Friday, October 15th arriving in San Francisco at 11:10 pm For the lowest fare simply say Continental Airlines For your requested airline, simply say United Airlines For more flight details simply say flight details To name your own price and save even more simply say PriceLine [response] Continental Airlines | |
| Your requested airline, United Airlines, would like to match the lowest fare. Would you like to be connected to your requested airline? [response] yes Thank you for using SpeakSoft Directory Assistance. We will now connect you to United Airlines. | Your requested airline, United Airlines, would like to match the lowest fare. Would you like to be connected to your requested airline? [response] yes Thank you for using SpeakSoft Directory Assistance. We will now connect you to United Airlines. | |

Figure 9:
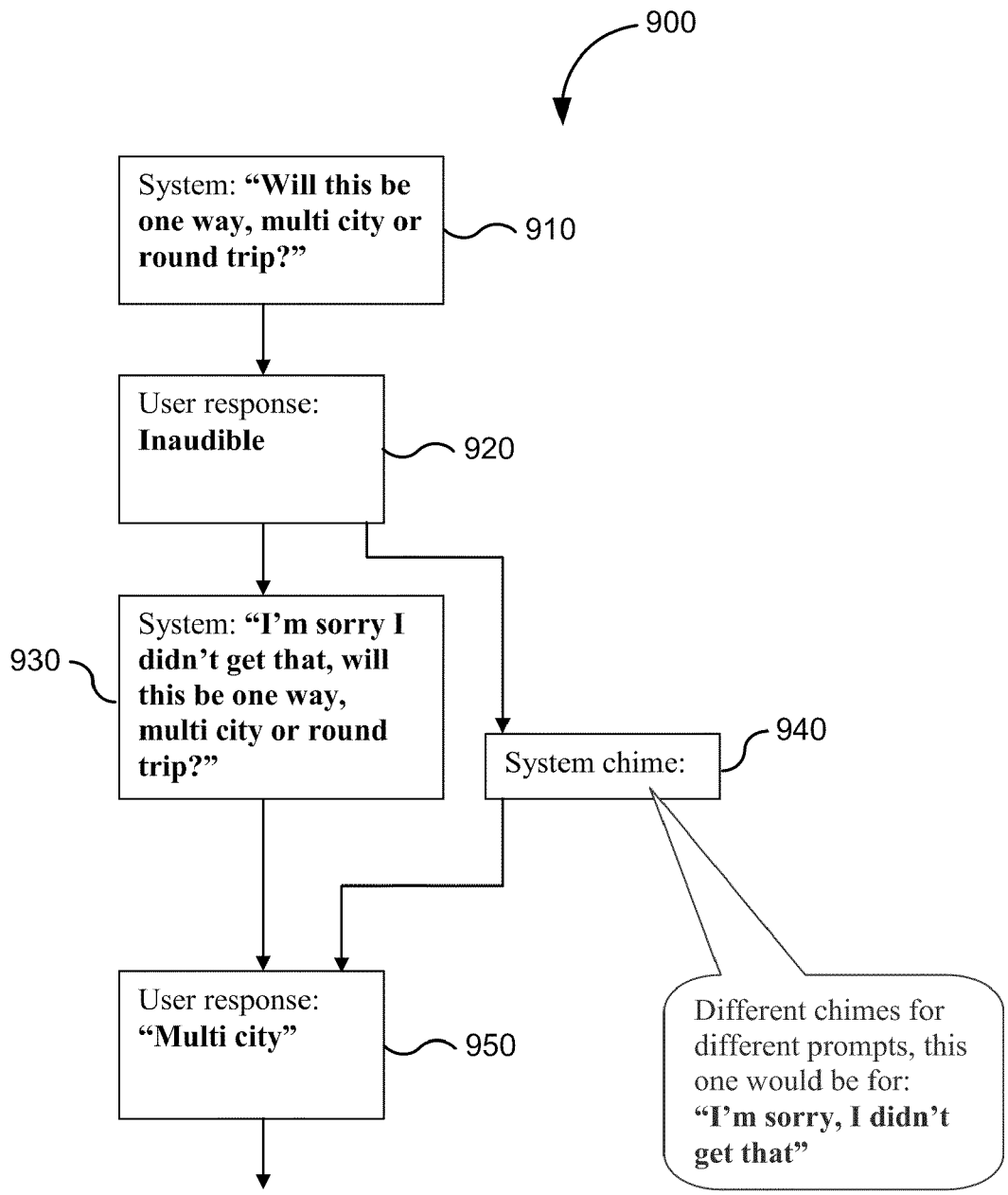
FIG. 9 is a flowchart of a method for optimizing a call flow using one or more audible alerts in one embodiment according to the present invention.

FIG. 9 is a flowchart of method 900 for optimizing a call flow using one or more audible alerts in one embodiment according to the present invention. The processing of method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In various embodiments, audio information, such as a chime or sound, can be played by system 100 as a shorthand for various system prompts. For example: system 100 can play a chime instead of saying "I'm sorry I didn't get that..." and then repeating a question verbatim. For example, in step 910, system 100 prompts: "Will this be one way, multi city or round trip?" In step 920, the user response with an inaudible response. In step 930, system 100 may prompt: "I'm sorry I didn't get that, will this be one way, multi city or round trip?" Alternatively, in step 940, system 100 may optimized the call flow using a system chime indicative of one or more meanings known to the user. Different chimes, alerts, sounds, etc. may be used to communicate different system prompts. System 100 may enable users to specify this as a user-selectable action because it can expedite a call-flow for power/experienced users, but might otherwise be too confusing for a novice. FIG. 9 ends in step 950 where the user responds with an audible response, such as "Multi City."

Figure 10:
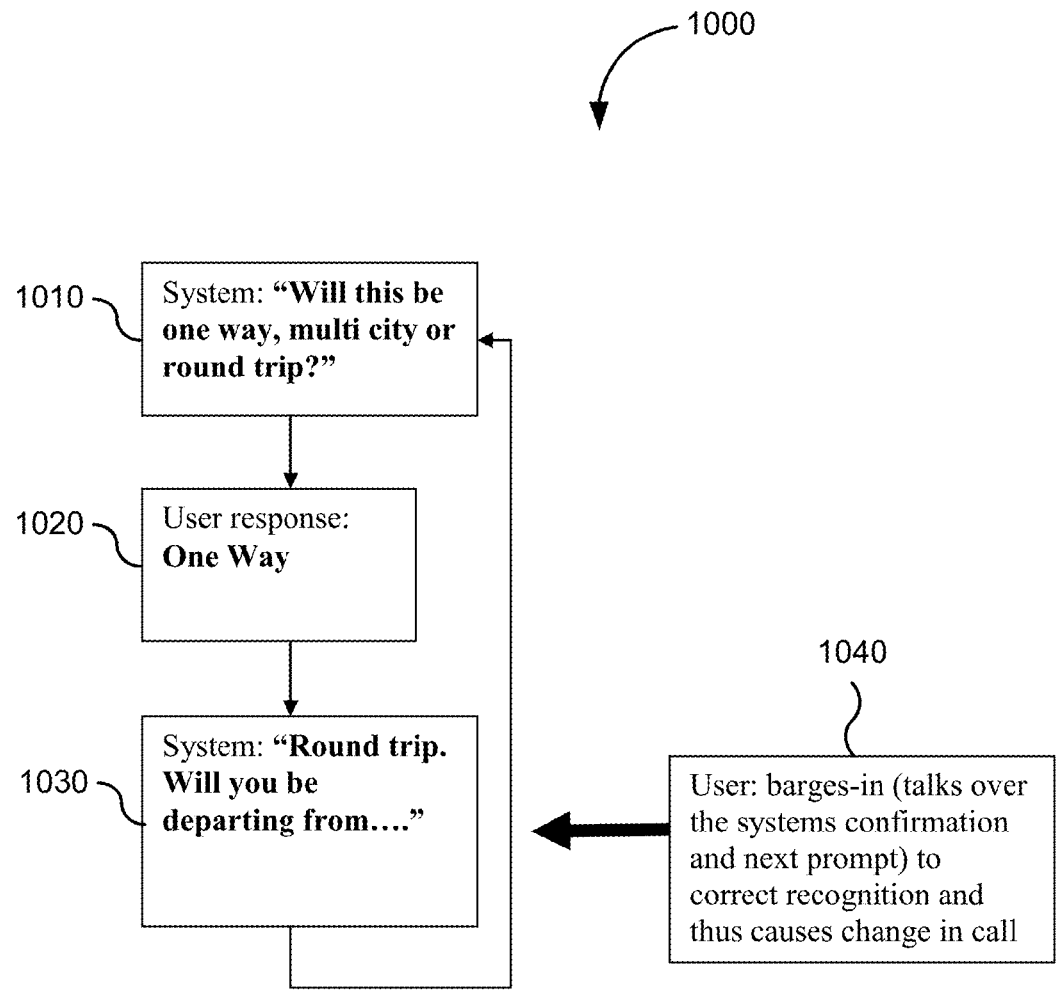
FIG. 10 is a flowchart of a method for optimizing a call flow in response to out-of-flow user input in one embodiment according to the present invention.

FIG. 10 is a flowchart of method 1000 for optimizing a call flow in response to out-of-flow user input in one embodiment according to the present invention. The processing of method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

In various embodiments, system 100 may optimize call flows in response to out-of-flow user input. For example, barge-in (e.g., were the user is speaking while the system is saying the next prompt) could be interpreted in different ways based on context, preferences, or the experience of a user. For example, in step 1010, system 100 may prompt: "Will this be one way, multi city or round trip?" In step 1020, the user may respond: "One Way." In step 1030, system 100 may respond incorrectly and prompt: "Round trip. Will you be departing from...." In step 1040, the user may barge-in causing one or more changes to the call flow.

In one example: a novice user may set barge-in preferences to "no" or "go-back", because they are probably barging-in to correct an error in a call flow. System 100 then may determine the appropriate next step to continue in the flow, such as repeating a previous prompt. An experienced user may select the barge-in to be an answer to the prompt without hearing the whole prompt, since they will know the prompt from experience. Both settings can, in some embodiments, negate the need for the whole prompt to be played, thus reducing unnecessary system prompt time and frustration for the user.

Figure 11:
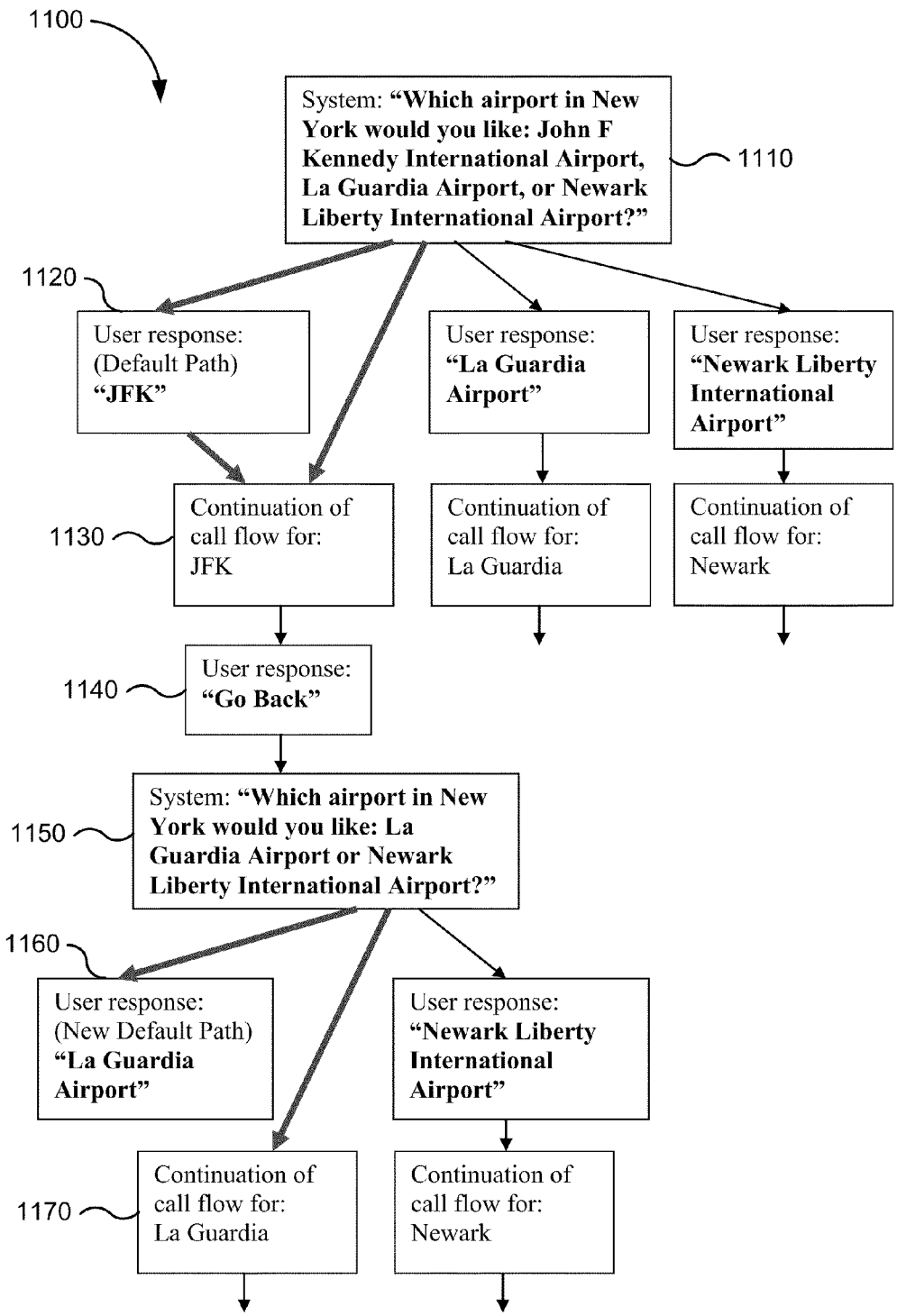
FIG. 11 is a flowchart of a method for optimizing a call flow based on correction information in one embodiment according to the present invention.

FIG. 11 is a flowchart of method 1100 for optimizing a call flow based on correction information in one embodiment according to the present invention. The processing of method 1100 depicted in FIG. 11 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1100 depicted in FIG. 11 begins in step 1110.

In various embodiments, system 100 may optimize call flows based on correction information. System 100 may implement Correction Modified (CM) call flows to tune reduce repetition and increase the chances of recognition. In some embodiments, Correction Modified call flows can change a call flow to remove one or more erroneous choices from system prompt options when a user makes corrections.

For example, in step 1110, system 100 may prompt the user with "Which airport in New York would you like: John F Kennedy International Airport, La Guardia Airport, or Newark Liberty International Airport?" System 100 may pick JFK as the default path or most likely response or in response to user input in step 1120 and continue on with the call flow in step 1130.

In step 1140, if that airport choice was not what the user wanted, the user may try to interrupt the system to go back and correct the input. If this happens, system 100 can determine that clearly JFK does not need to be an option in the next prompt in the call flow. Thus, in step 1150, system 100 prompts "Which airport in New York would you like: La Guardia Airport or Newark Liberty International Airport?" System 100 may pick the next most popular New York airport as the default path or most likely response or in response to user input in step 1160 and continue with the call flow in step 1170.

Figure 12:
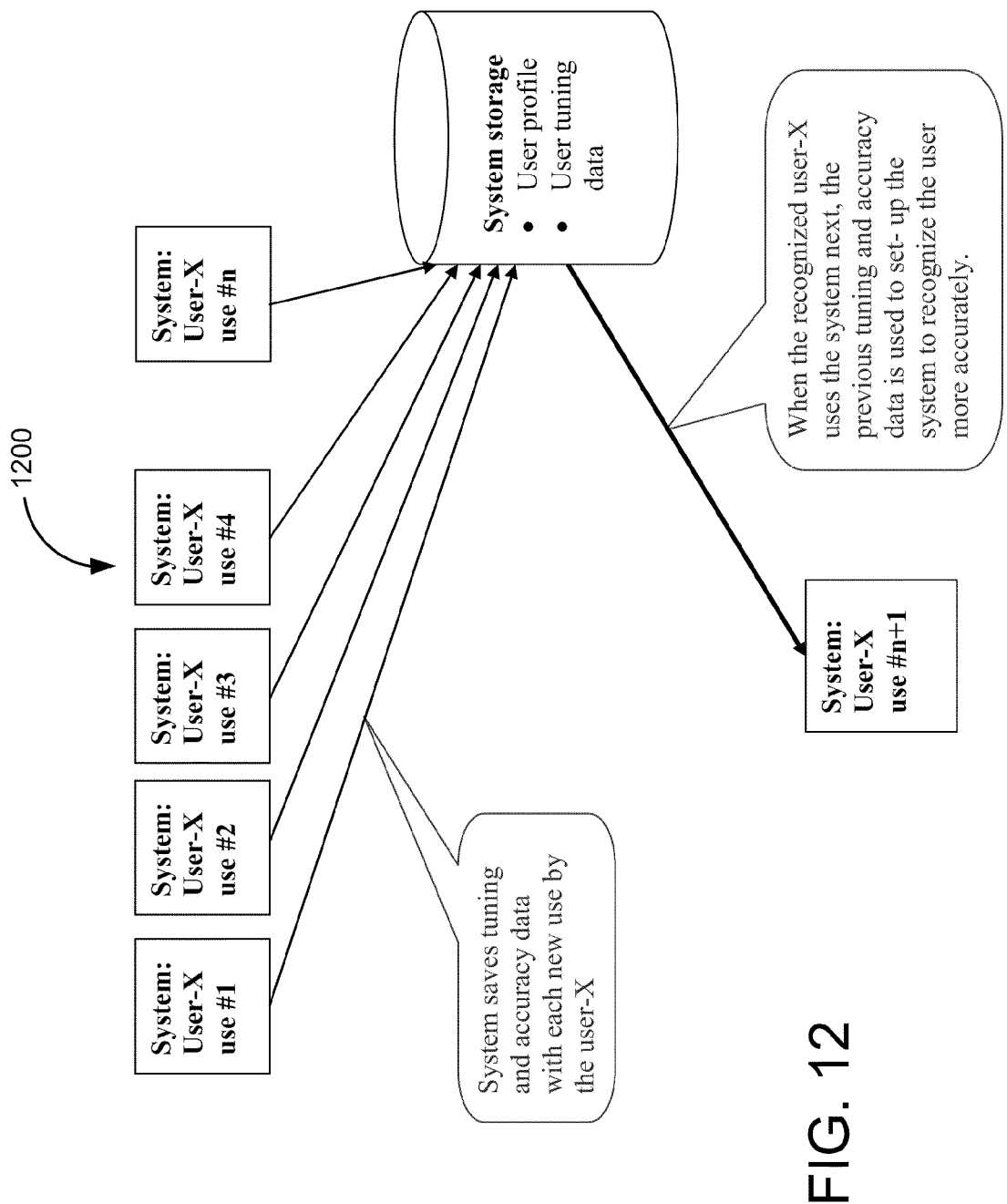
FIG. 12 depicts aspects of a tuned-recognition system in one embodiment according to the present invention.

FIG. 12 depicts aspects of tuned-recognition system 1200 in one embodiment according to the present invention. FIG. 12 is a simplified illustration of system 1200 that may incorporate various embodiments or implementations of the one or more inventions presented within this disclosure. FIG. 12 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

In this example, user-tuned recognition trains system 1200 to recognize the user more accurately by refining the recognition parameters with repeated use. System 1200 can identify repeat callers, such as from the phone number they are using. Parameters based on the user's voice quality, gathered when a user retries input, or when system 1200 detects higher probabilities of recognition can be used to tune system 1200 dynamically. So the next time the user calls, these parameters will be used to increase the likelihood of individual recognition. This can be preferable, and more efficient, than having system 1200 tuned to recognize all speakers'/users' voices.

Figure 13:
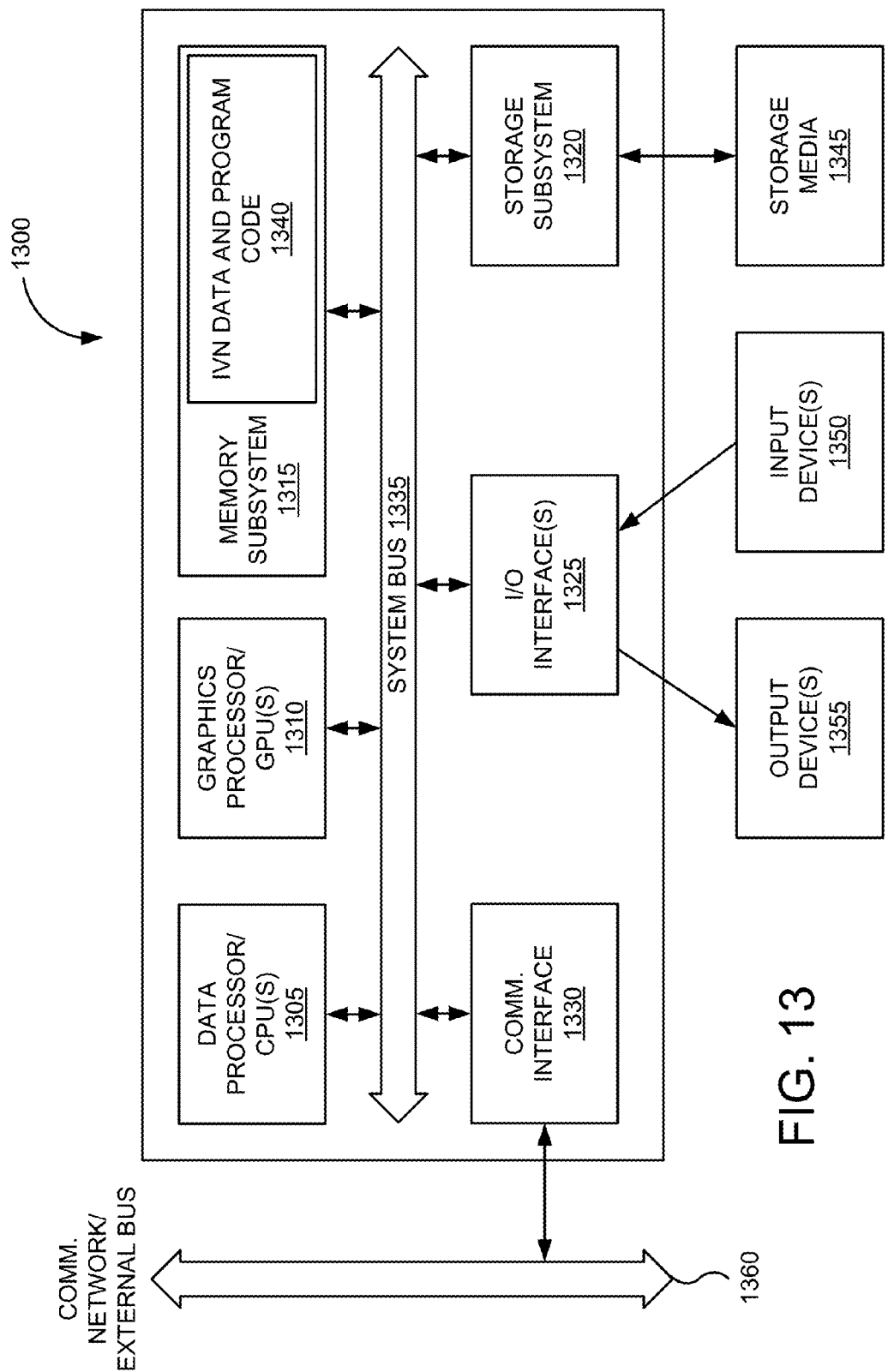
FIG. 13 is a block diagram of a computer system or information processing device that may be used to implement or practice various embodiments of an invention whose teachings may be presented herein.

FIG. 13 is a block diagram of computer system 1300 that may be used to implement or practice various embodiments of an invention whose teachings may be presented herein. FIG. 13 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1300 can include hardware and/or software elements configured for performing logic operations and calculations, input/output operations, machine communications, or the like. Computer system 1300 may include familiar computer components, such as one or more one or more data processors or central processing units (CPUs) 1305, one or more graphics processors or graphical processing units (GPUs) 1310, memory subsystem 1315, storage subsystem 1320, one or more input/output (I/O) interfaces 1325, communications interface 1330, or the like. Computer system 1300 can include system bus 1335 interconnecting the above components and providing functionality, such connectivity and inter-device communication. Computer system 1300 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1305 can include hardware and/or software elements configured for executing logic or program code or for providing application-specific functionality. Some examples of CPU(s) 1305 can include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. CPU(s) 1305 may also include one or more field-gate programmable arrays (FPGAs), application-specific integrated circuits (ASICs), or other microcontrollers. The one or more data processors or central processing units (CPUs) 1305 may include any number of registers, logic units, arithmetic units, caches, memory interfaces, or the like. The one or more data processors or central processing units (CPUs) 1305 may further be integrated, irremovably or moveably, into one or more motherboards or daughter boards.

The one or more graphics processor or graphical processing units (GPUs) 1310 can include hardware and/or software elements configured for executing logic or program code associated with graphics or for providing graphics-specific functionality. GPUs 1310 may include any conventional graphics processing unit, such as those provided by conventional video cards. Some examples of GPUs are commercially available from NVIDIA, ATI, and other vendors. In various embodiments, GPUs 1310 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1310 may include any number of registers, logic units, arithmetic units, caches, memory interfaces, or the like. The one or more data processors or central processing units (CPUs) 1305 may further be integrated, irremovably or moveably, into one or more motherboards or daughter boards that include dedicated video memories, frame buffers, or the like.

Memory subsystem 1315 can include hardware and/or software elements configured for storing information. Memory subsystem 1315 may store information using machine-readable articles, information storage devices, or computer-readable storage media. Some examples of these articles used by memory subsystem 1370 can include random access memories (RAM), read-only-memories (ROMS), volatile memories, non-volatile memories, and other semiconductor memories. In various embodiments, memory subsystem 1315 can include IVN data and program code 1340.

Storage subsystem 1320 can include hardware and/or software elements configured for storing information. Storage subsystem 1320 may store information using machine-readable articles, information storage devices, or computer-readable storage media. Storage subsystem 1320 may store information using storage media 1345. Some examples of storage media 1345 used by storage subsystem 1320 can include floppy disks, hard disks, optical storage media such as CD-ROMS, DVDs and bar codes, removable storage devices, networked storage devices, or the like. In some embodiments, all or part of IVN data and program code 1340 may be stored using storage subsystem 1320.

In various embodiments, computer system 1300 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system. Computer system 1300 may also include one or more applications configured to executed, perform, or otherwise implement techniques disclosed herein. These applications may be embodied as IVN data and program code 1340. Additionally, computer programs, executable computer code, human-readable source code, or the like, and data may be stored in memory subsystem 1315 and/or storage subsystem 1320.

The one or more input/output (I/O) interfaces 1325 can include hardware and/or software elements configured for performing I/O operations. One or more input devices 1350 and/or one or more output devices 1355 may be communicatively coupled to the one or more I/O interfaces 1325.

The one or more input devices 1350 can include hardware and/or software elements configured for receiving information from one or more sources for computer system 1300. Some examples of the one or more input devices 1350 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1350 may allow a user of computer system 1300 to interact with one or more non-graphical or graphical user interfaces to enter a comment, select objects, icons, text, user interface widgets, or other user interface elements that appear on a monitor/display device via a command, a click of a button, or the like.

The one or more output devices 1355 can include hardware and/or software elements configured for outputting information to one or more destinations for computer system 1300. Some examples of the one or more output devices 1355 can include a printer, a fax, a feedback device for a mouse or joystick, external storage systems, a monitor or other display device, a communications interface appropriately configured as a transceiver, or the like. The one or more output devices 1355 may allow a user of computer system 1300 to view objects, icons, text, user interface widgets, or other user interface elements.

A display device or monitor may be used with computer system 1300 and can include hardware and/or software elements configured for displaying information. Some examples include familiar display devices, such as a television monitor, a cathode ray tube (CRT), a liquid crystal display (LCD), or the like.

Communications interface 1330 can include hardware and/or software elements configured for performing communications operations, including sending and receiving data. Some examples of communications interface 1330 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1330 may be coupled to communications network/external bus 1380, such as a computer network, to a FireWire bus, a USB hub, or the like. In other embodiments, communications interface 1330 may be physically integrated as hardware on a motherboard or daughter board of computer system 1300, may be implemented as a software program, or the like, or may be implemented as a combination thereof.

In various embodiments, computer system 1300 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1300.

As suggested, FIG. 13 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

Various embodiments of any of one or more inventions whose teachings may be presented within this disclosure can be implemented in the form of logic in software, firmware, hardware, or a combination thereof The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for enhancing user experiences with Interactive Voice Response systems, the method comprising:
    receiving, at a computer system, call flow information establishing a call flow having a predetermined ordering of a series of intended steps and one or more alternative steps for selected intended steps in the series of intended steps, wherein users in the call flow advance from one intended step in the series of intended steps to another intended step in the series of intended steps based on any response other than one or more alternative valid responses for the one intended step that lead in the call flow to one or more alternative steps to the one intended step;
    determining, at the computer system, whether to allow a user to proceed from a first intended step in the series of intended steps to a second intended step in the series of intended steps; and based on a determination to allow the user to proceed from a first intended step in the series of intended steps to a second intended step in the series of intended steps, determining a first set of one or more messages for the second intended step based on the call flow information;
    communicating the first set of one or more messages to the user; and
    wherein the response other than one or more alternative valid responses causes the system to accept a default answer to the one intended step rather than to repeat the one intended step; and
    wherein the default answer corresponds to one of the one or more alternative valid responses.

2. The method of claim 1 further comprising: based on a determination not to allow the user to proceed from a first intended step in the series of intended steps to a second intended step in the series of intended steps, determining a second set of one or more messages for an alternative step to the first intended step based on the call flow information, and communicating the second set of one or more messages to the user.

3. The method of claim 2 further comprising: determining, at the computer system, whether to allow the user to proceed from the alternative step to a third intended step in the series of intended steps.

4. The method of claim 1 wherein determining, at the computer system, whether to allow the user to proceed from a first intended step in the series of intended steps to a second intended step in the series of intended steps comprises determining whether the user provided any response other than one or more alternative valid responses to the first intended step that lead in the call flow to one or more alternative steps to the first intended step.

5. The method of claim 1 wherein determining, at the computer system, whether to allow the user to proceed from a first intended step in the series of intended steps to a second intended step in the series of intended steps comprises determining whether a predetermined period of time has elapsed.

6. The method of claim 1 wherein determining, at the computer system, whether to allow the user to proceed from a first intended step in the series of intended steps to a second intended step in the series of intended steps comprises determining whether the user provided an alternative valid response to the first intended step that leads in the call flow to an alternative step to the first intended step.

7. The method of claim 1 wherein determining, at the computer system, whether to allow the user to proceed from a first intended step in the series of intended steps to a second intended step in the series of intended steps comprises determining whether a response required by the second intended step is provided by information known or discovered about the user.

8. The method of claim 7 wherein the information known or discovered about the user comprises a user profile.

9. The method of claim 7 wherein the information known or discovered about the user comprises one or more user preferences.

10. The method of claim 7 wherein the information known or discovered about the user comprises location information.

11. The method of claim 7 wherein the information known or discovered about the user comprises caller identification information.

12. The method of claim 1 wherein determining, at the computer system, whether to allow the user to proceed from a first intended step in the series of intended steps to a second intended step in the series of intended steps comprises determining whether a response required by the second intended step is provided by one or more templates.

13. The method of claim 12 wherein the one or more templates are populated by the user with information about travel itineraries, hotels, car rentals, or bookings.

14. The method of claim 1 wherein determining, at the computer system, whether to allow the user to proceed from a first intended step in the series of intended steps to a second intended step in the series of intended steps comprises: determining that a first response provided by the user is unrecognizable; and instead of re-communicating one or more messages to the user for the first intended step, communicating a third set of one or more messages to the user, the third set of one or more messages alerting the user that the first response is unrecognizable and that the user may continue in the call flow by providing a second response.

15. The method of claim 1 further comprising: communicating a second set of one or more messages to the user based on the call flow information, the second set of one or more messages presenting at least a first option and a second option to the user; determining to proceed in the call flow with the first option; determining whether a response provided by the user is indicative of a recognition error; and based on a determination that the response is indicative of a recognition error, communicating a third set of one or more messages to the user based on the call flow information, the second set of one or more messages presenting at least the second option to the user without presenting the first option.

16. The method of claim 1 further comprising: storing tuning and accuracy data for the user during a first call; recognizing the user as a repeat caller during a second call; and adjusting one or more user response recognition mechanisms based on the stored tuning and accuracy data for the user.

17. A non-transitory computer-readable storage medium storing a computer program product having computer-executable code for Interactive Voice Response systems, the computer readable storage medium comprising:
    code for receiving call flow information establishing a call flow having a predetermined ordering of a series of intended steps and one or more alternative steps for selected intended steps in the series of intended steps, wherein users in the call flow advance from one intended step in the series of intended steps to another intended step in the series of intended steps based on any response other than one or more alternative valid responses for the one intended step that lead in the call flow to one or more alternative steps to the one intended step;
    code for determining whether to allow a user to proceed from a first intended step in the series of intended steps to a second intended step in the series of intended steps; and
    code for, based on a determination to allow the user to proceed from a first intended step in the series of intended steps to a second intended step in the series of intended steps, determining a first set of one or more messages for the second intended step based on the call flow information; and code for communicating the first set of one or more messages to the user; and
    wherein the response other than one or more alternative valid responses causes the system to accept a default answer to the one intended step rather than to repeat the one intended step; and
    wherein the default answer corresponds to one of the one or more alternative valid responses.

18. The non-transitory computer-readable storage medium of claim 17 further comprising: code for, based on a determination not to allow the user to proceed from a first intended step in the series of intended steps to a second intended step in the series of intended steps, determining a second set of one or more messages for an alternative step to the first intended step based on the call flow information; and code for communicating the second set of one or more messages to the user.

19. The non-transitory computer-readable storage medium of claim 18 further comprising: code for determining whether to allow the user to proceed from the alternative step to a third intended step in the series of intended steps.

20. The non-transitory computer-readable storage medium of claim 17 wherein the code for determining whether to allow the user to proceed from a first intended step in the series of intended steps to a second intended step in the series of intended steps comprises code for determining whether the user provided any response other than one or more alternative valid responses to the first intended step that lead in the call flow to one or more alternative steps to the first intended step.

21. The non-transitory computer-readable storage medium of claim 17 wherein the code for determining whether to allow the user to proceed from a first intended step in the series of intended steps to a second intended step in the series of intended steps comprises code for determining whether a predetermined period of time has elapsed.

22. The non-transitory computer-readable storage medium of claim 17 wherein the code for determining whether to allow the user to proceed from a first intended step in the series of intended steps to a second intended step in the series of intended steps comprises code for determining whether the user provided an alternative valid response to the first intended step that leads in the call flow to an alternative step to the first intended step.

23. The non-transitory computer-readable storage medium of claim 17 wherein the code for determining whether to allow the user to proceed from a first intended step in the series of intended steps to a second intended step in the series of intended steps comprises code for determining whether a response required by the second intended step is provided by information known or discovered about the user.

24. The non-transitory computer-readable storage medium of claim 17 wherein the code for determining whether to allow the user to proceed from a first intended step in the series of intended steps to a second intended step in the series of intended steps comprises code for determining whether a response required by the second intended step is provided by one or more templates.

25. The non-transitory computer-readable storage medium of claim 24 further comprising code for allowing the user to populate the one or more templates with information about travel itineraries, hotels, car rentals, or bookings.

26. The non-transitory computer-readable storage medium of claim 17 wherein the code for determining whether to allow the user to proceed from a first intended step in the series of intended steps to a second intended step in the series of intended steps comprises: code for determining that a first response provided by the user is unrecognizable; and code for, instead of re-communicating one or more messages to the user for the first intended step, communicating a third set of one or more messages to the user, the third set of one or more messages alerting the user that the first response is unrecognizable and that the user may continue in the call flow by providing a second response.

27. The non-transitory computer-readable storage medium of claim 17 further comprising: code for communicating a second set of one or more messages to the user based on the call flow information, the second set of one or more messages presenting at least a first option and a second option to the user; code for determining to proceed in the call flow with the first option; code for determining whether a response provided by the user is indicative of a recognition error; and code for based on a determination that the response is indicative of a recognition error, communicating a third set of one or more messages to the user based on the call flow information, the second set of one or more messages presenting at least the second option to the user without presenting the first option.

28. The non-transitory computer-readable storage medium of claim 17 further comprising: code for storing tuning and accuracy data for the user during a first call; code for recognizing the user as a repeat caller during a second call; and code for adjusting one or more user response recognition mechanisms based on the stored tuning and accuracy data for the user.

29. An Interactive Voice Response system having a set of one or more computer systems, the system comprising: means for receiving call flow information establishing a call flow having a predetermined ordering of a series of intended steps and one or more alternative steps for selected intended steps in the series of intended steps, wherein users in the call flow advance from one intended step in the series of intended steps to another intended step in the series of intended steps based on any response other than one or more alternative valid responses for the one intended step that lead in the call flow to one or more alternative steps to the one intended step; means for determining whether to allow a user to proceed from a first intended step in the series of intended steps to a second intended step in the series of intended steps; and means for, based on a determination to allow the user to proceed from a first intended step in the series of intended steps to a second intended step in the series of intended steps, determining a first set of one or more messages for the second intended step based on the call flow information; and means for communicating the first set of one or more messages to the user;
    wherein the response other than one or more alternative valid responses causes the system to accept a default answer to one intended step rather than to repeat the one intended step; and
    wherein the default answer corresponds to one of the one or more alternative valid responses.

\* \* \* \* \*